United States Patent [19]

Lipp

[11] 4,334,178
[45] Jun. 8, 1982

[54] METHOD AND APPARATUS FOR CORRECTING TOOL LENGTHS AND TOOL RADII, PARTICULARLY FOR NUMERICALLY CONTROLLED MACHINES EQUIPPED WITH POSITION OR PATH MEASURING SYSTEMS BY MEANS OF NOMINAL-ACTUAL VALUE COMPARISON

[75] Inventor: Willi Lipp, Witten-Annen, Fed. Rep. of Germany

[73] Assignee: Hüller Hille GmbH, Fed. Rep. of Germany

[21] Appl. No.: 86,948

[22] Filed: Oct. 22, 1979

[30] Foreign Application Priority Data

Nov. 2, 1978 [DE] Fed. Rep. of Germany ....... 2847510

[51] Int. Cl.$^3$ .............................................. G05B 19/24
[52] U.S. Cl. ..................................... 318/572; 318/632
[58] Field of Search ......................... 318/572, 632, 561

[56] References Cited

U.S. PATENT DOCUMENTS 4,070,608 1/1978 Rosshirt et al. ...................... 318/572
4,214,191 7/1980 Watanabe et al. ............... 318/572 X Primary Examiner—B. Dobeck
Attorney, Agent, or Firm—McGlew and Tuttle

[57] ABSTRACT

A method of correcting tool lengths and tool radii, particularly for numerically controlled machines equipped with position or path measuring systems by means of a nominal-actual value comparison up to a length and radii with the actual values which comprises, comparing the length and radius of the tool with an actual value by means of the position or path measuring system with which the machine is equipped and which are associated with the axes of motion, storing the difference of the values with the correct sign in a correction memory of the numerical control as a tool length or radius correction, and wherein, the nominal actual value comparison is effected in the zero position or at the zero passage of an analog of a digital transmitter which is disposed so that its zero or zero passage position in the Z-axis and the X-axis corresponds to constant spacing from the machine (a+b). The device comprises a feeler housing which is mounted on mounting means of the machine adjacent the tool holder spindle and which includes a first feeler pin mounted in the feeler housing extending along the Z-axis and having a first switching portion and a second feeler pin extending along the X-axis perpendicular to the first feeler pin and spaced in height from said first feeler pin with gear means interconnecting said first and second feeler pins for moving one in response to movement of the other in respect to its associated axis. At least one limit tracer is disposed in the Z-axis and at least one inductive transmitter is disposed in the X-axis and stop means are disposed in said housing. Spring means urge the first and second feeler pins outwardly to apply against the stop means in the housing. Each limit tracer in the Z-axis is switchable by an associated switching portion of the feeler pin and an inductive transmitter extends parallel to the axis of the second feeler pin and is movable in the X-axis and disposed relative to the second feeler pin so as to be switched by a switching member portion thereof.

7 Claims, 6 Drawing Figures

METHOD AND APPARATUS FOR CORRECTING TOOL LENGTHS AND TOOL RADII, PARTICULARLY FOR NUMERICALLY CONTROLLED MACHINES EQUIPPED WITH POSITION OR PATH MEASURING SYSTEMS BY MEANS OF NOMINAL-ACTUAL VALUE COMPARISON

FIELD AND BACKGROUND OF THE INVENTION

This invention relates to a method and apparatus for correcting a machine tool in general and, in particular, to a new and useful method and device for correcting tool lengths and tool radii particularly for numerically controlled machines equipped with positional path measuring systems by means of nominal-actual value comparison.

While preparing part programs for numerically controlled machine tools, particularly work stations, the control of the tool length and tool radius during a milling operation, for example, starts from the nominal dimension of the tool or from the dimension equal to zero of the length or radius of the tool. The actual deviations from a nominal or zero dimension are entered into the numerical control separately as so-called tool length or tool radius corrections. This is usually done by hand or by means of a special punched tape.

In order to determine the respective actual dimension, the length and, if needed, also the cutting radius of each tool, each individual tool must be measured prior to starting the job. With large tool sets, a long total time is spent for this purpose. Also, measuring the correction values and transferring them, for example, to punched tapes, or entering such values into a numerical control, normally involves risks of error. These are errors which, under the most favorable conditions lead to rejects, and under the most unfavorable conditions, can cause considerable damage or even destruction of the tool. Automatic measuring of the tools and thus determining as well as entering of the corrections into the numerical control eliminates these errors and minimizes the time needed therefor.

Designs are known in which this problem is solved by providing additional measuring systems as a permanent part of the equipment of the machine. However, this means that one or more measuring systems for automatically determining the tool length and radius corrections are necessary in addition to the measuring systems (X-Y- and Z-axis) which are also needed in a numerically controlled machine. These costs are very high and unfavorably affect the economy of such equipment.

SUMMARY OF THE INVENTION

The present invention is directed to a method which makes it possible to reduce the costs of an automatic correction of tool lengths and radii to such an extent that the process of correction becomes economical. The considerable expenses for automatically moving the measuring systems into or out of the working range, which is necessary in the prior art, are also eliminated.

In accordance with the invention, there is provided a method of correcting tool lengths and tool radii particularly for numerically controlled machines equipped with positional path measuring systems by means of a nominal-actual value comparison which is characterized in that the program nominal tool lengths and radii are compared with the actual values thereof by means of the position or path measuring systems with which the machine is equipped and which are associated with the axis of motion, and the difference with the correct sign is stored in a correction memory of the numerical control as a length or radius correction, and that the nominal actual value comparison is effected in the zero position or at the zero passage of one of an analog and differential transmitter which is disposed so that its zero or zero passage position in the Z-axis and the X-axis corresponds to constant spacing from the machine (a+b).

The inventive apparatus advantageously includes a feeler housing with precision-mounted feeler pins thereon, offset in height and extending in the X-axis and the Z-axis perpendicular to each other. A pinion extends perpendicular to the axes of the two feeler pins and is connected to the pins through gear portions or toothed segments thereof so that they move in their respective axes in response to movement of each other. At least one limit tracer is disposed in the Z-axis and at least one inductive transmitter in the X-axis. The feeler pins are arranged by springs outwardly to apply against a stop provided in the housing. Each limit tracer in the Z-axis is switchable by an associated switching indentation provided in the feeler pin. The inductive transmitter extends parallel to the axis of the feeler pin which is movable in the X-axis and can be switched by a switching member secured to the pin.

It is substantial that what is needed for carrying out the method are only three limit tracers and an inductive transmitter whose zero passage is evaluated for the position control. The limit tracers and the inductive transmitter are series-produced, inexpensive articles, which are fixedly mounted in a two-axis feeler assembly.

The fundamental difference over the prior art is that, in order to automatically determine the correction values, no additional one- or two-axis measuring systems which move separately are necessary. The invention instead utilizes the measuring coordinate systems X and Z, or Y and Z which are, in any event, included in numerically controlled machines. Only the zero point for comparing the nominal and actual values is produced by means of a simple, fixed device.

Accordingly, an object of the present invention is to provide an improved method and apparatus for correcting tool lengths and tool radii, particularly for numerically controlled machines, equipped with positional path measuring systems, by means of a nominal-actual comparison.

A further object of the invention is to provide apparatus for correcting tool lengths and tool radii, particularly for numerically controlled machines, equipped with position or path measuring systems by means of a nominal-actual value comparison which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
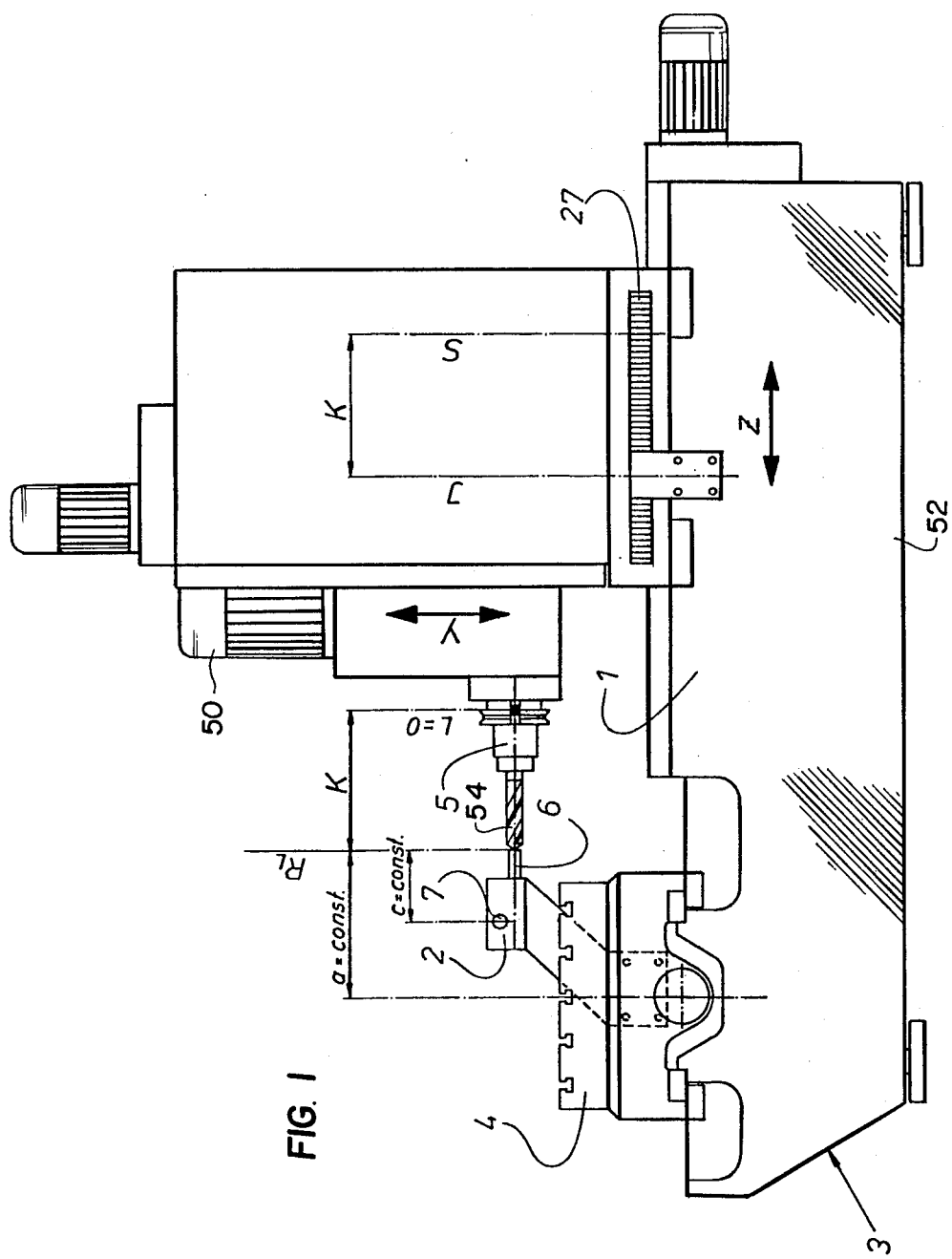
FIG. 1 is a side elevational view of a horizontal work station with the tools in position and having means for correcting tool length and radii, constructed in accordance with the invention.

Referring to the drawings in particular, the invention embodied therein, comprises, a tool machine 3 which includes a drive motor 50 mounted on a base 52. Drive motor 50 drives a work spindle 5 which carries or holds a tool 54. In accordance with the invention, the machine is equipped with means for correcting the automatic operation of the device to work on a workpiece so as to accommodate changes in tool lengths and tool radii.

Figure 2:
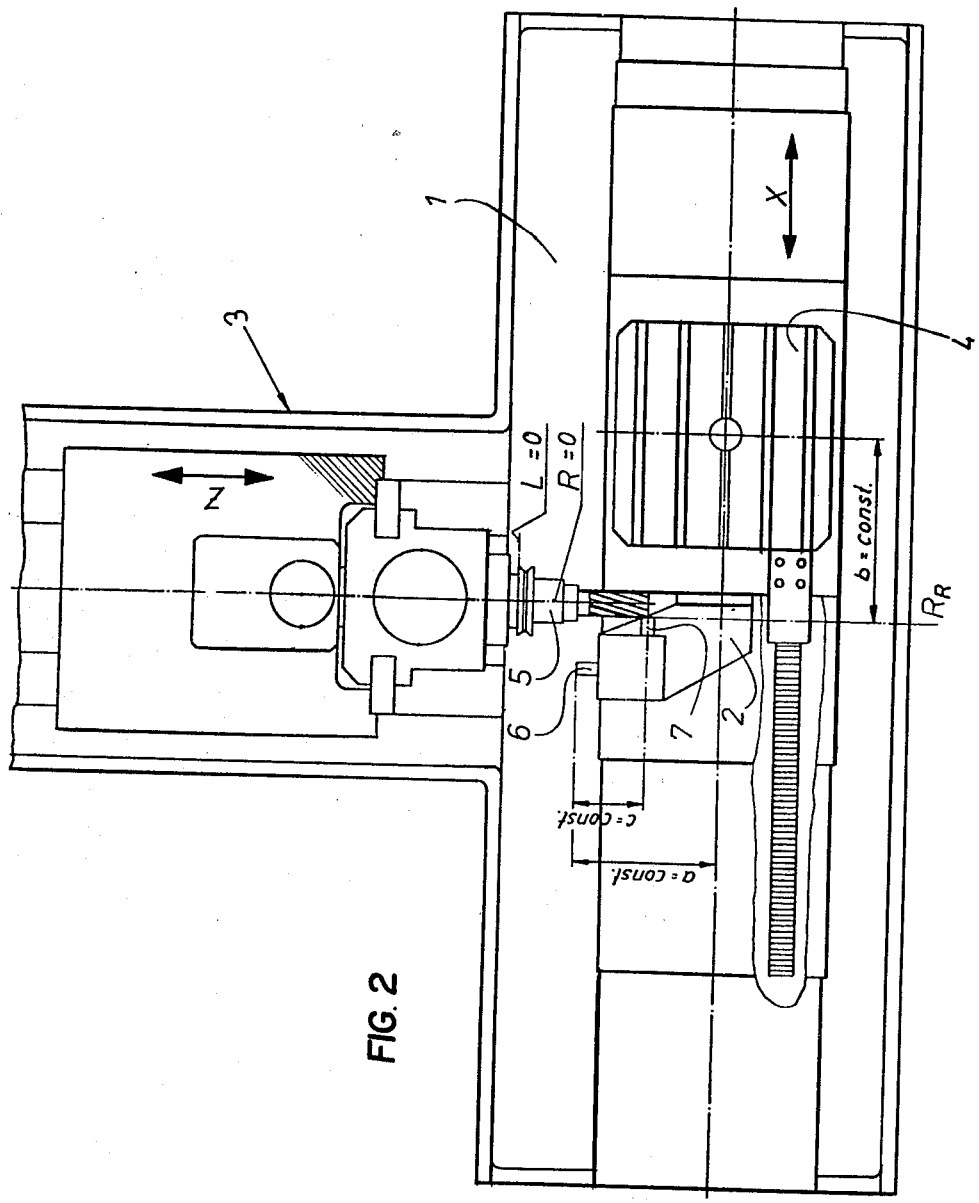
FIG. 2 is a top plan view of the machine shown in FIG. 1.

In a horizontal work station, according to FIG. 1, the tool 54, which in the present example, is a twist drill, is programmed with a tool length zero and, as shown in FIG. 2, a tool radius zero. By means of a two-axis feeler assembly secured to the X-table and a position measuring system of the Z-axis with which the numerically controlled machine is equipped in any case, the actual length of the tool is determined by means of the feeler assembly and a position measuring system of the X- or Y-axis with which the machine is also equipped. Both values are entered into the numerical control as correction values.

A two-axis feeler assembly 2 is mounted on machine table 1, which is movable along the X-axis, at such a location that it remains within the operating range of the machine 3, but outside the working space proper. This feeler assembly 2 is firmly secured to the lower part of table 4 traveling in the X-axis direction, and is moved along therewith. Feeler assembly 2 in the Y-axis is fixedly positioned.

Working machine 3, which in the present example is a numerically controlled work station with a horizontal work spindle 5, is equipped with direct position measuring systems, one for each of the three axes of motion. Indirect position or path measuring systems, however, are also suitable.

Figure 3:
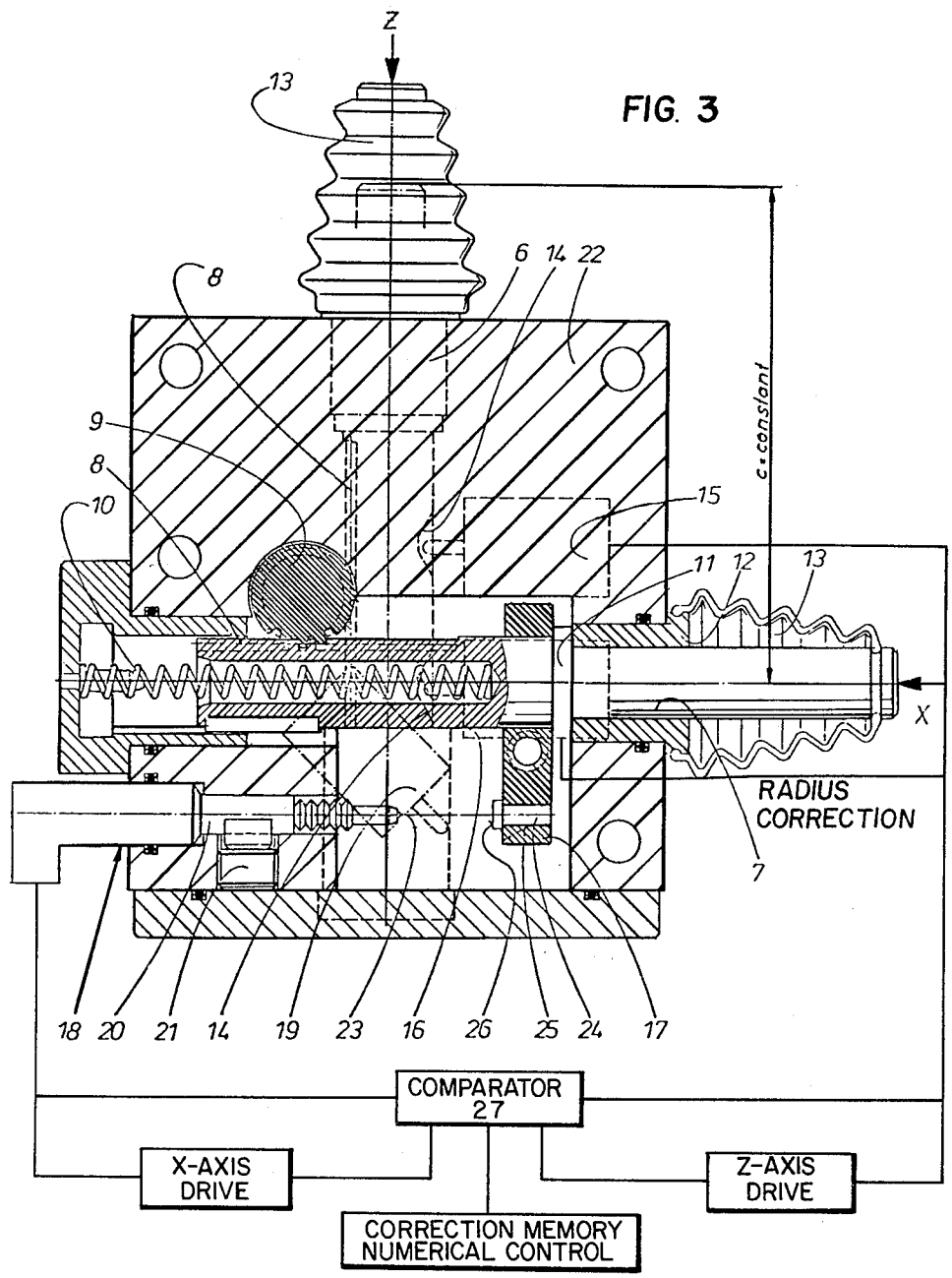
FIG. 3 is an enlarged sectional view of a two-axis feeler assembly mounted on the X-table of the machine shown in FIG. 1.

Two-axis feeler assembly 2 is shown in FIG. 3 and it comprises two precision-mounted feeler pins 6 and 7 which are offset in height relative to each other and are connected to each other by means of toothed pin portions 8 and a common pinion 9, with very little play. In the top view of FIG. 3, feeler pins 6 and 7 extend exactly perpendicularly to each other. That is, feeler pin 6 intended for the tool length correction extends in the Z-axis and is movable in this direction, while feeler pin 7 intended for the tool radius correction extends in the X-axis of working machine 3 and is movable in that direction. Due to the positive engagement of the feeler pins 6 and 7 through toothed portions 8 on each pin and the pinion 9 therebetween, their motions are interrelated and perfectly synchronous. If, for example, feeler pin 6 is moved along the Z-axis, feeler pin 7 which extends at a right angle thereto is positively moved along the X-axis, and vice-versa.

This positive interconnection of feeler pins 6 and 7 makes it possible to determine the tool length and radius corrections (in the Z and X directions) by providing shift members 10 and control members 11 along only one axis for each of the parameters. This considerably reduces not only the costs, but also the space needed for the two-axis feeler assembly and the control box.

Each of the feeler pins 6 and 7 is urged to the outside by means of the associated shift member 10 which is in the form of a helical spring. In their initial position, feeler pins 6 and 7 apply, by means of a control member 11, having the form of a collar, against a bearing bushing 12. To prevent even the finest of dirt particles from penetrating to feeler pins 6 and 7, the pins are hermetically covered to the outside by rubber bellows 13. Feeler pin 6, extending in the Z-axis, is made with two switch indentations 14, by which two limit tracers 15 and 16 are actuated, to reduce the rapid-traverse speed to a reference speed. Limit tracer 16 is adjusted so that it switches a little later than limit tracer 15, for example, with an interval of 0.2–0.5 mm. This double arrangement is not absolutely necessary, but is advisable for reasons of security.

Feeler pin 7, extending in the X-axis, carries a switch member 17 which is fitted thereon behind control member or collar 11, and is intended for actuating the inductive transmitter 18 and an additional safety limit tracer 19. Inductive transmitter 18 extends parallel to the axis of feeler pin 7 and has an actuating stroke of about ±2 mm. Its shank 20 is connected to the housing 22 of the two-axis feeler assembly 2 by means of a clamp 21.

The zero position of inductive transmitter 18 is the position relative to which, as soon as it is attained, the tool length and radius corrections are determined. The tip of inductive transmitter 18 carries a hard-metal ball 23 serving as a contact surface cooperating with an opposite hardened bolt 24 press-fitted in switch member 17 of X-axis feeler pin 7. The fine zero point adjustment of conductive transmitter 18 is effected in the evaluating electronic section.

Further, switch member 17 is formed with a switch bevel 25 for actuating an additional safety limit tracer 19 which is adjusted to deliver an emergency off signal upon an erroneous overtravel by about 0.2 mm of the zero point of the inductive transmitter, thereby, preventing damage or destruction of the tool, the Z-axis feeler pin, or the machine 3.

In the described embodiment of the two-axis feeler assembly 2, the direct actuation of inductive transmitter 18 is provided in the X-axis since, as a rule, the tool radii must be adjusted with more precision than the tool lengths and because with this arrangement and a direct actuation, any transmission errors are eliminated and maximum accuracy in the X-axis is obtained. In principle, however, inductive transmitter 18 may also be provided in the Z-axis.

The actuating stroke of feeler pins 6 and 7 is of a length such that, upon abutting against limit tracers 15, 16, the rapid-traverse speed in the respective axis of motion (Z or X) starts to decrease and the reference speed is securely reached before inductive transmitter 18 is actuated by the hardened bolt 24 impinging on contact surface 26. As from this instant, the motion along the respective axis continues in a controlled manner until the zero point of inductive transmitter 18 is reached.

The inductive transmitter 18 is an analog switch delivering voltages analogously varying with its position. This voltage is used to energize the drive in a controlled manner until the zero position is obtained. During the controlled motion from the reference speed down to the zero position, a total distance of about 2 mm is covered.

In the above description, the invention has been applied to a horizontal work station. In principle, however, it may also be applied with small changes to vertical work stations, since there is no difference in the function.

The following is an explanation of how the correction values are determined:

It is assumed that the part program has been based on the tool length and tool radius equal to zero. In principle, a program may also be based on the nominal length of the tool. However, the described system is advantageous because it furnishes correction values having equal signs.

As shown in FIG. 1, the two-axis feeler assembly 2 is mounted to have the zero point of inductive transmitter 18 spaced in the Z direction from the central plane of machine table 1 by a constant distance a. While programming with a tool length equal to zero, dimensions are obtained for the individual positions of the Z-axis which, with the tools in place, are too far forward, by the actual length of the tool. To obtain the desired positions with regard to the workpiece, they must be corrected by the correction values which correspond to the actual tool lengths and are determined automatically as described hereinafter.

Figure 6:
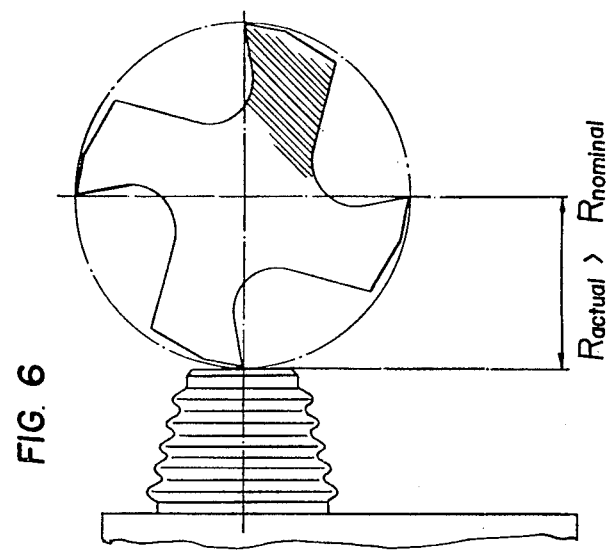
FIGS. 5 and 6 are enlarged views illustrating how the radius of a milling cutter is determined.

Prior to starting a new part program, all of the tools needed therefor are placed in the tool magazine of the work station. While working the first piece, the tools received in work spindle 5 are moved by means of by-passable sub-routines, recalled through so-termed macro-instructions, in the X and the Y directions, until they are concentrical with the axis of the feeler pin. The instruction "move in the Z direction up to tool length zero equal to a (constant)" is then given. However, since any inserted tool is longer than zero, the tip of the tool which, in the example shown is a twist drill, impinges on the feeler pin at the rapid-traverse speed and the pin actuates limit tracers 15 or 16, whereupon, in accordance with the drive, the rapid-traverse speed is decelerated until the reference speed is reached. At this speed, the inductive transmitter is encountered by which the Z-axis is moved in a controlled manner into the zero position of the transmitter (FIG. 6). As soon as this position is attained, the nominal-actual value comparison is effected, that is, the programmed value of the Z-axis is compared with the value now present in the position measuring system 27 of machine 3. The difference found with the correct sign is transmitted to the numerical control as a tool length correction which, with the sub-routine eliminated, is taken into account in the further run of the program. During this first run of a part program, this sequence is repeated as many times as necessary for as many tools as are received in the magazine.

In further runs of the part program in the same production series, the sub-routines are suppressed and only the normal sequence of the part program is performed. As for determining the correction value for the tool radius, attention is drawn to FIG. 2. FIG. 2 shows the arrangement of the two-axis feeler assembly 2 in which, due to the zero point of inductive transmitter 18 as related to the center of machine table 1, a constant distance b in the X-direction is obtained.

In tools where a radius correction is involved (end mill cutters, shell-type plain milling cutters, etc.), a tool length correction is also necessary, as a rule, so that in such instances, the two sub-routines are recalled in sequence, first for the tool length correction and then for the tool radius correction. This sequential order is important for a fully automatic operation, since the automatic determination of the tool length and automatic addition of a constant length c in the two-axis feeler assembly 2 (FIG. 3) ensures that during the subsequent automatic determination of the tool radius, the cutting edges to be measured will lie in the Z-axis and in the center of the X-axis feeler pin 7. This means that only a constant distance in the Y direction is to be provided by the programmer in the sub-routine for determining the tool radius, to get the tool axis to the level of the axis of the X-axis feeler pin 7.

As soon as the tool length is automatically determined in the manner described in the foregoing, machine 3 performs a rearward motion through about 3 mm in the Z-axis and then machine table 1 moves to the right in the X-direction until the X-axis feeler pin 7 is spaced from the tool axis by a distance which is larger than the maximum tool radius rated for the specific machine 3. At the same time, machine 3 moves in the Y-direction until the tool axis is exactly at the same level with the feeler pin axis. The constant length c is automatically added to the determined tool length and, with these lengths taken into account, machine 3 is automatically moved in the Z-direction until the front face or edge of the tool coincides in the Z-direction with the axis of the X-axis feeler pin 7.

Upon reaching the Z-position, the machine table with two-axis feeler assembly 2 moves at the rapid-traverse speed in the X-direction toward the tool until X-axis feeler pin 7 contacts the periphery of the tool. Thereupon, as already described in connection with the tool length correction, a deceleration of the rapid-traverse speed to the reference speed is started and, after this reference speed is reached, inductive transmitter 18 moves into its zero position. This sequence of motions differs from that performed during the length correction solely in that the X-direction is involved instead of the Z-direction.

Figure 5:
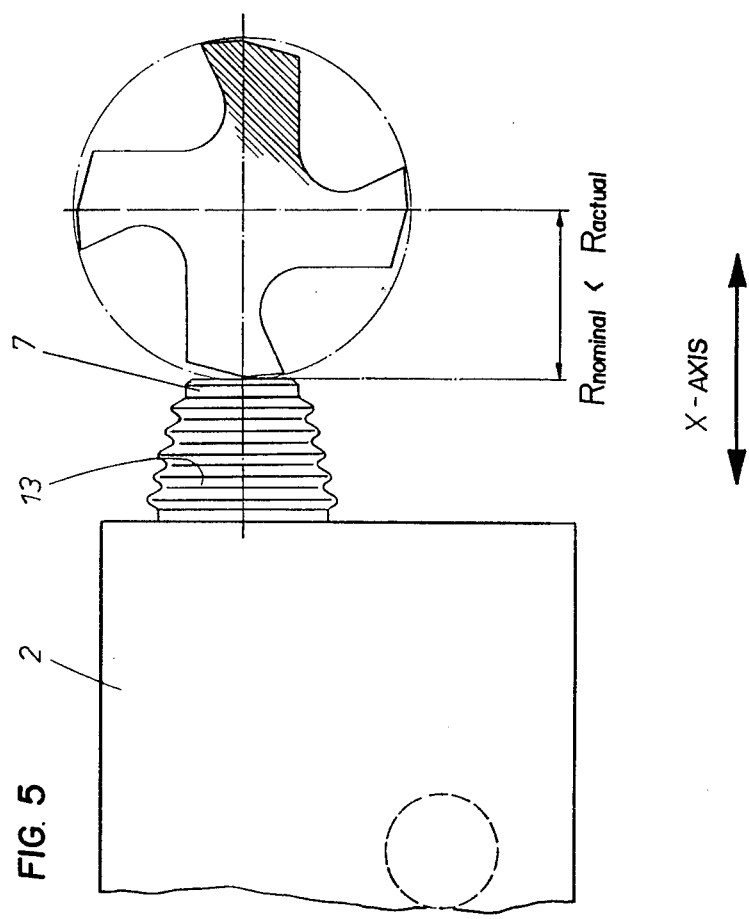

Damage to the cutting edges of the tool upon contacting the feeler pin face at the rapid-traverse speed is avoided by inserting the tools into work spindle 5 in such a position that X-axis feeler pin 7 first contacts a free end surface or flank of the tool rather than a cutting edge (FIG. 5). Upon reaching the zero position of inductive transmitter 18, work spindle 5 holding the tool is slowly turned opposite to the cutting direction until the maximum tool radius is aligned with the feeler axis (FIG. 6). Inductive transmitter 18 controlling the X-axis drive automatically readjusts the position, and the X-axis position measuring system 27 of the machine determines the maximum value which can then be entered into the correction memory of the numerical control as correction of the programmed tool radius equal to zero.

Subsequently, the machine moves in the opposite X-direction through about 30 mm at the rapid-traverse speed, to disengage X-axis feeler pin 7 from the tool, and further into a position determined by the programmer to perform with this tool the working operation as provided in the part program. Again, the above-described sub-routine stored in the memory of the numerical control is recalled only before the first use of the tool. During the following instructions, recalling the same tool, the sub-routine is suppressed, since the correction values are already known and stored in the correction memory of the numerical control.

The sub-routines for both the tool lengths and the radii may be recalled again after certain working periods of the tools, for example, to take into account the wear of the cutting edges of the tool by a new correction, that is, to redetermine the correction values. Here again, the above description is applied to a work station equipped with a horizontal work spindle. However, the same goes for a corresponding arrangement of the two-axis feeler assembly 2 in work stations having a vertical work spindle.

Figure 4:
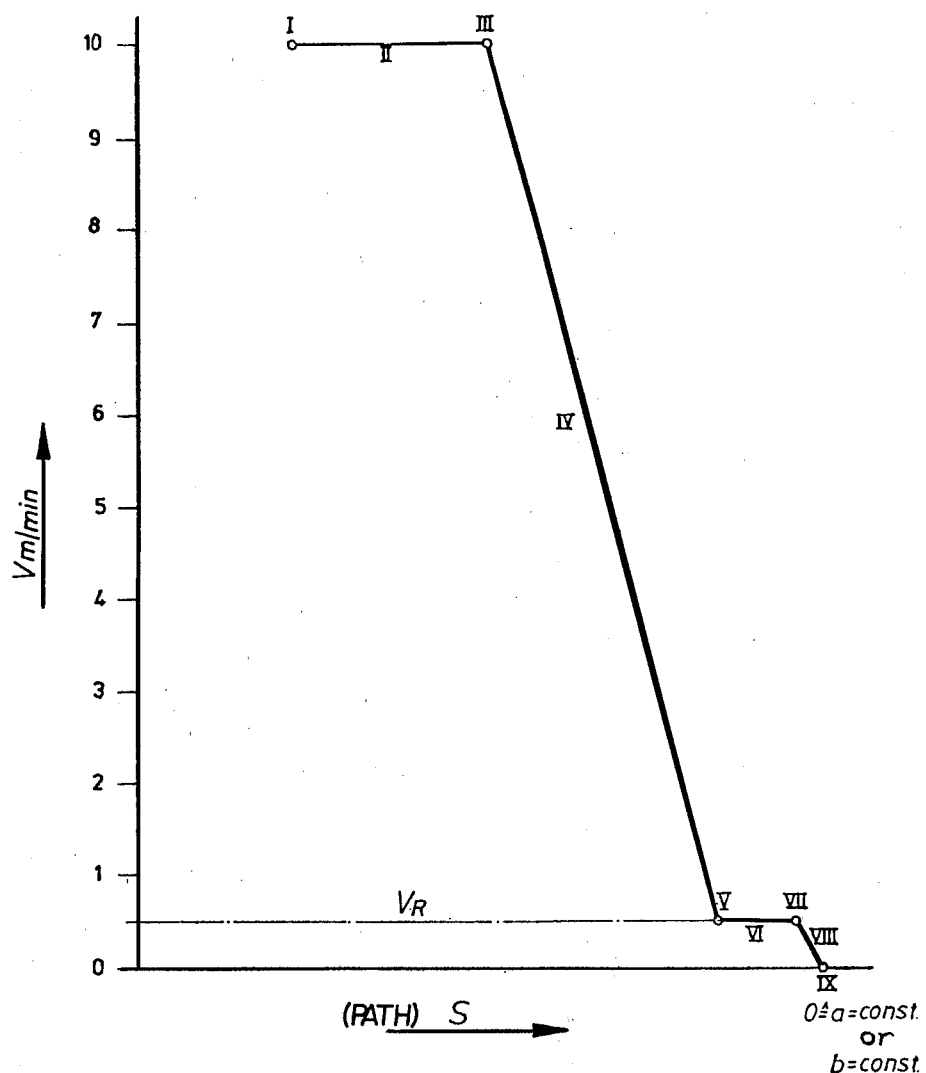
FIG. 4 is a functional graph showing how the automatic tool length correction is performed.

FIG. 4 is a functional graph illustrating the automatic correction of the tool length or tool radius. Plotted on the horizontal axis of the graph is the path s, on the vertical axis the speed in meters per minute of feeler pin 6 or 7. The roman numerals along the values of the variable designate the following:

I—X and Y, or Y and Z in desired position
II—Travel at the rapid-traverse speed
III—Actuation of the limit tracer
IV—Speed reduction to the reference speed (VR)
V—Reference speed reached
VI—Travel at the reference speed
VII—Actuation of the inductive transmitter
VIII—Motion into the zero position
IX—Zero position of the inductive transmitter reached.

Thus, a method of correcting two lengths and two radii, according to the invention, particularly for numerically controlled machines equipped with positional path measuring systems, by means of nominal-actual value comparison of the length and radius of the two, includes the steps of comparing the nominal length and radius of the two within actual value by means of the position or path measuring system with which the machine is equipped and which are associated with the axes of motion of the two, storing the difference with the correct sign in a correction memory of the numerical control at the length or radius correction, wherein the actual value of comparison is effected in the zero-position or at the zero-passage of one of an analogue or a digital transmitter which is disposed so that the zero and zero-passage position in the z-axis and x-axis corresponds to constant spacings from the machine (a+b). In accordance with the preferred embodiment of the invention, the machine includes a digital zero transmitter accommodated in the feeler housing and using two feeler pins which extend perpendicularly to each other in the z- and x-axes and which are operationally connected to each other by positive engagement for movement along their respective axes. The machine preferably includes a tool which abuts against one of the feeler pins and further includes a limit tracer diposed in a position to be actuated by the feeler, by which a breaking in the respective axis of motion of the tool from a rapid-traverse speed to a reference speed is started. In accordance with the preferred method, the feeler pin actuates the zero-transmitter and, in accordance with the error signal, a controlled motion toward or into the zero or zero passage position of the transducer is effected. With an automatic radius correction, first an automatic length correction is effected at the z-position of the tool and the subsequent radius correction is automatically determined.

While a specific embodiment of the invention has been shown and described in detail to illustrate the application of the principles of the invention, it will be understood that the invention may be embodied otherwise without departing from such principles.

What is claimed is:

1. A method of correcting tool lengths and tool radii, particularly for numerically controlled machines equipped with position or path measuring systems, by means of nominal-actual value comparison of the length and radius of the tool, comprising, comparing the nominal length and radius of the tool with an actual value by means of the position or path measuring system with which the machine is equipped and which are associated with the axes of motion of the tool, storing the difference with the correct sign in a correction memory of the numerical control as a length or radius correction, wherein, the actual value comparison is effected in the zero position or at the zero passage of one of an analog and a digital transmitter which is disposed so that its zero or zero passage position in the Z-axis and in the X-axis corresponds to constant spacings from the machine (a+b).

2. A method of correcting tool lengths and tool radii, as claimed in claim 1, wherein the machine includes a digital zero transmitter accommodated in the feeler housing and using two feeler pins which extend perpendicularly to each other in the Z- and X-axes and which are operationally connected to each other by positive engagement for movement along their respective axes.

3. A method of correcting tool lengths and tool radii, as claimed in claim 2, wherein the machine includes a tool which abuts against one of the feeler pins, and including a limit tracer disposed in a position to be actuated by the feeler, by which a braking in the respective axis of motion of the tool from a rapid-traverse speed to a reference speed is started.

4. A method of correcting tool lengths and tool radii, as claimed in claim 2, wherein the feeler pin actuates the zero transmitter and, in accordance with the error signal, a controlled motion toward or into the zero or zero passage position of the transducer is effected.

5. A method of correcting tool lengths and tool radii, as claimed in claim 1, wherein with an automatic radius correction, first an automatic length correction is effected at which the Z-position of the tool necessary for the subsequent radius correction is automatically determined.

6. A device for correcting tool lengths and tool radii, of a machine having a machine housing with a spindle for mounting the tool, and which is equipped with position or path measuring systems, comprising, a feeler housing, mounting means for mounting said feeler housing on said machine adjacent the tool holder spindle, a first feeler pin mounted in said feeler housing extending along the Z-axis and having a first switching portion, a second feeler pin mounted on said feeler housing and extending along the X-axis perpendicular to the first feeler pin and spaced in height from said first feeler pin, gear means connecting said first and second pins together for movement of the respective pins along their respective axis in response to the movement of the other, at least one limit tracer disposed in the Z-axis in said housing, at least one inductive transmitter disposed along the X-axis of said housing, stop means in said housing, spring means urging said first and second feeler pins outwardly to apply against said stop means, each limit tracer in the Z-axis being switchable by the associated switching portion of said first and second feeler pins, an inductive transmitter extending parallel to the axis of said second feeler pin and being movable in the X-axis and disposed relative to said second feeler pin so that it will be switched by said switching portion thereof.

7. A device for correcting tool lengths and tool radii, as claimed in claim 6, wherein said switching portion includes a bevelled area provided on each of said feelers against which said switch is biased so that it is switched upon coming into said bevelled area.

* * * * *